United States Patent
Crane

(10) Patent No.: US 8,467,914 B2
(45) Date of Patent: Jun. 18, 2013

(54) BIT TRANSMISSION VERIFICATION IN AN ARINC-BASED SYSTEM

(75) Inventor: Bruce J. Crane, East Granby, CT (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/195,340

(22) Filed: Aug. 1, 2011

(65) Prior Publication Data

US 2013/0035807 A1 Feb. 7, 2013

(51) Int. Cl.
*G06F 7/00* (2006.01)

(52) U.S. Cl.
USPC .................................................. 701/3

(58) Field of Classification Search
USPC .................................................. 701/3
See application file for complete search history.

(56) References Cited

U.S. PATENT DOCUMENTS

| | | | |
|---|---|---|---|
| 4,393,498 A * | 7/1983 | Jackson et al. | 714/46 |
| 4,646,324 A | 2/1987 | Albano et al. | |
| 5,864,687 A | 1/1999 | Baker et al. | |
| 6,151,567 A | 11/2000 | Ames et al. | |
| 6,360,290 B1 | 3/2002 | Avritch et al. | |
| 6,470,224 B1 | 10/2002 | Drake et al. | |
| 6,813,777 B1 | 11/2004 | Weinberger et al. | |
| 7,181,146 B1 | 2/2007 | Yorks | |
| 7,395,483 B1 | 7/2008 | Tourancheau et al. | |
| 7,673,217 B2 | 3/2010 | Emde et al. | |
| 2003/0115543 A1 | 6/2003 | Emde et al. | |
| 2006/0062143 A1 | 3/2006 | Bibby | |
| 2011/0184607 A1 * | 7/2011 | Beacham et al. | 701/35 |

FOREIGN PATENT DOCUMENTS

| | | |
|---|---|---|
| DE | 4212742 | 10/1993 |
| EP | 2124154 | 9/2012 |

OTHER PUBLICATIONS

ARINC 420 Bus Interface, p. 1-22, Sep. 2006.
Holt Integrated Circuits, AN-140, HI-3585 Design Example, Jul. 2010.
Holt Integrated Circuits, HI-3585, HI-3586, ARINC 429, Nov. 2010.
European Search Report dated Nov. 1, 2012 for European Patent Application 12178657.8.

* cited by examiner

*Primary Examiner* — Kim T Nguyen
(74) *Attorney, Agent, or Firm* — Carlson, Gaskey & Olds, P.C.

(57) ABSTRACT

An example data verification method includes communicating a bit from a transmitter module to a receiver module through a bus. The bit forms a portion of an ARINC word. The method verifies the bit at the bus using the transmitter module. An example data communication assembly includes a receiver module, and a data communication bus that communicates a bit to the receiver module. The bit forms a portion of an ARINC word. A transmitter module communicates the bit to the data communication bus. The transmitter module monitors communication of the bit from the data communication bus to the receiver module.

21 Claims, 1 Drawing Sheet

BIT TRANSMISSION VERIFICATION IN AN ARINC-BASED SYSTEM

BACKGROUND

This disclosure relates generally to communications and, more particularly, to verifying ARINC communications at a bit level.

ARINC standards are well known and widely used. Some ARINC standards provide guidelines for the communications, the wiring, the installations, the data buses, and the databases associated with aircraft. Other ARINC standards provide guidelines for controlling analog avionic equipment and other digital systems and equipment associated with aircraft.

One specific ARINC standard, ARINC 429, provides electrical and data guidelines for serial buses and related components. Within the ARINC 429 standard, data transmits as words. Each word includes 32-bits and has five separate fields: a label field, a source/destination identifier field, a date field, a sign field, and a parity field. The 32-bits of the word are transmitted individually. Some systems verify the transmission of ARINC words by comparing an entire transmitted word to an entire received word. This comparison requires significant processing power. Some systems verify the transmission of ARINC words using complex hardware components.

SUMMARY

An example data verification method includes communicating a bit from a transmitter module to a receiver module through a bus. The bit forms a portion of an ARINC word. The method verifies the bit at the bus using the transmitter module.

Another example data verification method includes distributing a bit from a transmitter module to a bus using an ARINC standard. The method verifies the distribution to the bus using the transmitter module. The method distributes the bit from the bus to a receiver module.

An example data communication assembly includes a receiver module and a data communication bus that communicates a bit to the receiver module. The bit forms a portion of an ARINC word. A transmitter module communicates the bit to the data communication bus. The transmitter module also monitors communication of the bit from the data communication bus to the receiver module.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
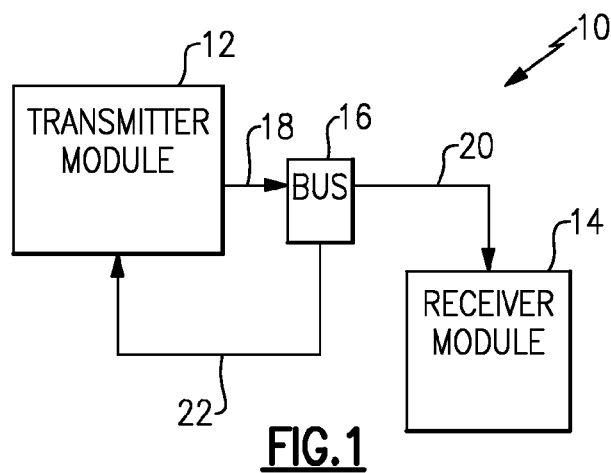
FIG. 1 shows a highly schematic view of an example aircraft data communication assembly.

Referring to FIG. 1, a data communication assembly 10 includes a transmitter module 12 and a receiver module 14. Data moves from the transmitter module 12 to the receiver module 14 through a bus 16. The example data communication assembly 10 is an aircraft data communication assembly.

Data communications between the transmitter module 12 and the receiver module 14 comply with an ARINC 429 standard. Although described with reference to the ARINC 429 standards of an aircraft system, the disclosed methods could be applied within other systems and other standards, such as RS-232, RS-422, etc.

The ARINC 429 standard transmits data as 32-bit words. In this example, a bit of the 32-bit words move along path 18 from the transmitter module 12 to the bus 16. The bus 16 then communicates the bit to the receiver module 14 along the path 20. The next bit in the 32-bit word is then communicated from the transmitter module 12. The receiver module 14 responds after all bits in the 32-bit word have been received.

In this example, information about the bit at the bus 16 is communicated back to the transmitter module 12 along a path 22. The transmitter module 12 compares this information to what was sent to the bus 16 along the path 18. If the information received from the path 22 matches what was send to the bus 16, the transmitter module 12 determines that the transmission of the bit to the bus 16 was correct. If the information received from the path 22 does not match what was sent to the bus 16, the transmitter module 12 determines that the transmission of the bit to the bus 16 was not correct. The example aircraft data communication assembly 10 thus verifies the transmission of individual bit from the transmitter module 12 to the bus 16.

Figure 2:
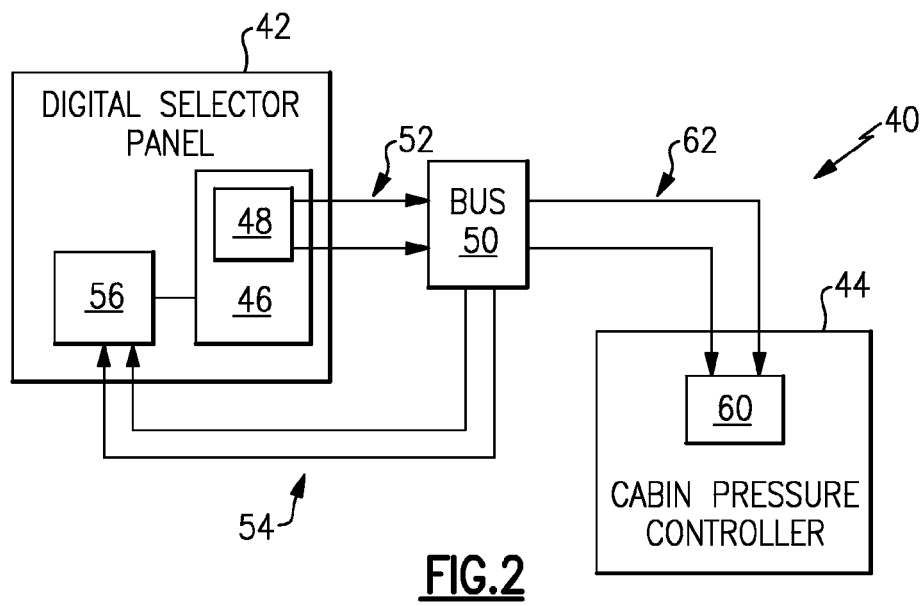
FIG. 2 shows a detailed view of another example data communication assembly.

Referring now to FIG. 2, another example aircraft data communication assembly 40 includes a transmitter module that controls a receiver module. In this example, the transmitter module is represented as a digital selector panel 42, and the receiver module is represented as a cabin pressure controller 44.

The example digital selector panel 42 is a computer that communicates with the cabin pressure controller 44 using low-speed ARINC 429 XGate software. The ARINC 429 specification defines low-speed operation as having a bit rate of 12.0-14.5 kbps, and high-speed operation as having a bit rate of 100 kbps.

Although only a single cabin pressure controller 44 is shown, other examples may include controlling a multiple of the cabin pressure controller 44 using the digital selector panel 42. ARINC 429 compliant communication busses typically connect a single transmitter to one or more receivers. In this example, the digital selector panel 42 is connected through the bus 50 to only one receiver, which is the cabin pressure controller 44.

The digital selector panel 42 and the cabin pressure controller 44 are both onboard an aircraft. The digital selector panel 42 sends commands to the cabin pressure controller 44 to adjust a pressure within a cabin of the aircraft, for example.

A microcontroller 46 of the digital selector panel 42 executes a software program that breaks a proposed command into 32-bits to form an ARINC word. The example microcontroller 46 is a Freescale MC9S12XDP512 microcontroller, which includes an S12 processor core and an XGate co-processor core. The program utilizes a transmitter interrupt handler 48 which runs on the XGate core and may utilize an area of RAM that is shared between the two cores.

During operation, the program uses the transmitter interrupt handler 48 of microcontroller 46 to schedule transmission of the individual bits of the ARINC word to the bus 50. The transmitter interrupt handler 48 may utilize other hardware of the microcontroller 46 during the scheduling, such as an enhanced capture timer.

After scheduling, the program on the microcontroller 46 initiates transmission of a bit to the bus 50 through the transmitter interrupt handler 48. The bit moves to the bus along the path 52, which, in this example, includes two separate output wires coupled to respective pins.

The end time of the transmitted bit, and the state of the next bit of the word, are also calculated. The end time and state are used to establish a programmed time for transmitting the next bit of the ARINC word. The end time and state values are programmed into compare-and-action registers of an enhanced capture timer of the microcontroller 46, for example.

When the enhanced capture timer reaches the programmed time, the next bit of the word is communicated to the bus 50 and the program requests an XGate interrupt. When the XGate interrupt is serviced, the program recalculates and reprograms an end time and state for the next bit in the ARINC word. This transmitter portion of the program then repeats until reaching the final bit of the ARINC word, which is a parity bit calculated by the transmitter interrupt handler 48.

A comparison portion of the program communicates information about the bit at the bus 50 back to a receiver 56 of the digital selector panel 42 along a path 54. The information about the bit is communicated back to the receiver 56 while the bit is active on the bus 50.

This information about the bit is converted to a digital value within the digital selector panel 42, and compared to the bit sent from the transmitter interrupt handler 48 to the bus 50 along the path 52. The comparison ensures that the bus 50 was moved to the proper voltages in response to the transmission of the bit along the path 52. The comparison may be executed on the XGate co-processor of the microcontroller 46. Thus, no separate component is required to make the comparison.

The comparison between the bit information sent along the path 52 to the bus 50 and the bit information from the path 54 identifies transmission errors at the bus 50 while sending the bit from the bus 50 to the cabin pressure controller 44. The program running within the aircraft data communication assembly 40 thus has a bit readback functionality or a wraparound capability. If an error is detected, the program may report and record a wraparound fault status. Capturing a bit error in real-time while the bit it being transmitted can enable rapid fault detection and isolation. Bitwise comparison as each bit is transmitted reduces the amount of data buffering, post-processing, data unpacking, and delay associated with full word-based or message-based error checking.

Regarding transmission of the bit from the bus 50, a receiver 60 of the cabin pressure controller 44 receives the sequential bits of information from the bus 50 sent along the path 62. The receiver 60 is activated based on the receipt of data bits from the bus 50. When all 32 bits of an ARINC word are received at the receiver 60, the cabin pressure controller 44 responds to the ARINC word command by adjusting a cabin altitude schedule, for example. The cabin pressure controller 44 may communicate information back to the digital selector panel 42, such as cruise flight level and landing field elevations, which may then be displayed to a pilot of the aircraft.

The transmitter interrupt handler 48, in this example, provides a minimum 4-bit gap time between separate 32-bit ARINC words. The receiver 60 detects these gaps to synchronize the beginning of each word within the ARINC 429 transmission.

After an entire 32-bit ARINC word has been received at the receiver 60, the bits of the ARINC word are summed to perform a parity check that validates the word. The cabin pressure controller 44 is then commanded based on the ARINC word. The cabin pressure controller 44 may initiate software that adjusts a pressure in an aircraft cabin in response to the ARINC word.

In these examples, the bus 50 is shown schematically as being separate from both the digital selector panel 42 and the cabin pressure controller 44. However, the bus 50 may include the two wires extending from the transmitter interrupt handler 48 (within the digital selector panel 42) to the receiver 60 (within the cabin pressure controller 44). That is, the bus 50 may include a portion that is internal to the digital selector panel 42, and a portion that is internal to the cabin pressure controller 44. The wraparound techniques of this disclosure could take place on portions of the bus 50 within the digital selector panel 42 or the cabin pressure controller 44 in addition to locations outside the digital selector panel 42 and the cabin pressure controller 44.

Figure 3:
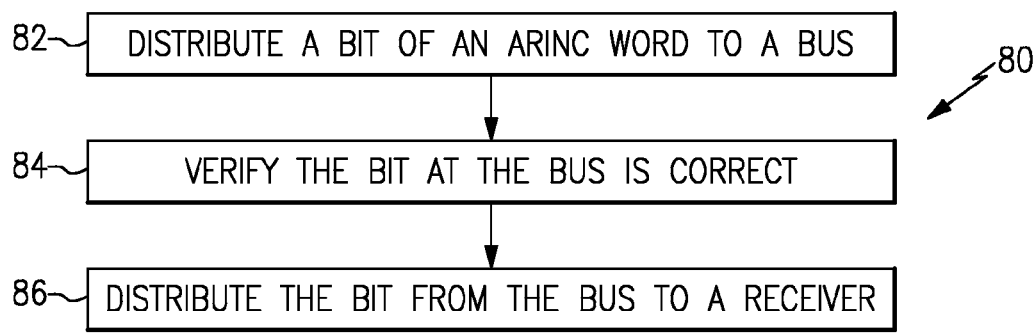
FIG. 3 shows the flow of an example data verification method utilized with the FIG. 1 data communication assembly.

Referring now to FIG. 3 with continuing reference to FIG. 2, the flow of an example method 80 of verifying data includes a step 82 of distributing a bit of an ARINC word to a bus. The method 80 verifies that the bit at the bus is correct at a step 84. Verification includes comparing information about the bit at the bus to what was sent to the bus. The method 80 distributes the bit from the bus to a receiver at a step 86.

Features of the disclosed examples include software that simplifies verification of data transmission within ARINC environments. The disclosed examples eliminate complex verification hardware, which saves space, power, and costs.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A data verification method, comprising the steps of:
communicating a bit from a transmitter module to at least one receiver module through a bus, the bit forming a portion of an ARINC word; and
verifying the bit at the bus using the transmitter module.

2. The data verification method of claim 1, including communicating another bit of the ARINC word through the bus and verifying the other bit at the bus using the transmitter module.

3. The data verification method of claim 1, wherein the verifying includes transmitting information about the bit from the bus back to the transmitter module.

4. The data verification method of claim 1, including initiating software in the at least one receiver module based on receipt of the bit from the transmitter module.

5. The data verification method of claim 4, wherein the at least one receiver module records time between bits communicated from the transmitter module.

6. The data verification method of claim 4, wherein the at least one receiver module comprises an aircraft cabin pressure controller.

7. The data verification method of claim 1, wherein the transmitter module comprises software that is executed on a microcontroller.

8. The data verification method of claim 1, wherein the verifying is performed while the transmitter module is communicating the bit.

9. The data verification method of claim 1, wherein the communicating and the verifying both take place entirely on board an aircraft.

10. A data verification method, comprising the steps of:
(a) distributing a bit from a transmitter module to a bus using an ARINC standard;

(b) verifying the distributing of said step (a) using the transmitter module; and (c) distributing the bit from the bus to at least one receiver module.

11. The data verification method of claim 10, wherein the bit forms a portion of a 32-bit ARINC word.

12. The data verification method of claim 10, wherein the at least one receiver module comprises an aircraft cabin pressure controller.

13. The data verification method of claim 10, wherein the verifying comprises determining a voltage of the bus, the voltage established in response to the bit distribution to the bus; and comparing a value representing of the determined voltage of the bus to the transmitted bit.

14. The data verification method of claim 10, wherein the transmitter module comprises software that is executed on a microcontroller.

15. The data verification method of claim 10, wherein the verifying is performed while the transmitter module is communicating the bit.

16. A data communication assembly, comprising:
a receiver module;
a data communication bus that communicates a bit to the receiver module, the bit forming a portion of an ARINC word; and
a transmitter module that communicates the bit to the data communication bus, and monitors communication of the bit from the data communication bus to the receiver module.

17. The data communication assembly of claim 16, wherein the receiver is a portion of a cabin air pressure controller.

18. The data communication assembly of claim 16, wherein the bit communicates from the transmitter module to the data communication bus along a two-pin connector.

19. The data communication assembly of claim 16, wherein the ARINC word is a 32-bit ARINC word.

20. The data communication assembly of claim 16, wherein the transmitter module includes a microcontroller configured to execute software.

21. The data communication assembly of claim 16, wherein the transmitter module monitors the communication of the bit while the transmitter module is communicating the bit.

* * * * *